Oct. 2, 1962  E. H. LAND ETAL  3,056,342
EXPOSURE CONTROL MECHANISM
Filed May 15, 1958  2 Sheets-Sheet 1

INVENTORS
Edwin H. Land
David J. Grey
BY
Brown and Mikulka
ATTORNEYS

United States Patent Office 3,056,342
Patented Oct. 2, 1962

3,056,342
EXPOSURE CONTROL MECHANISM
Edwin H. Land, Cambridge, and David S. Grey, Lexington, Mass., assignors to Polaroid Corporation, Cambridge, Mass., a corporation of Delaware
Filed May 15, 1958, Ser. No. 735,620
30 Claims. (Cl. 95—59)

This invention relates to photographic devices and particularly to exposure control mechanisms.

Exposure control mechanisms for photographic devices wherein shutter exposure time has been regulated by incorporating a means for mechanically governing shutter speed are well known and old in the art. Adjustments in shutter speed of these mechanisms had been made by manual manipulation in accordance with the operator's photographic judgment, and later, with the advent of the electric photocell, in accordance with readings made by the operator of a photometer. Attempts to bypass the operator's function by coupling the photocell with the governing means have since been made. However, such coupling of a photosensitive means with a mechanical governing means requires an intermediate device for translating the output of the photosensitive means into mechanical displacements for controlling the governing means. In such a governing means, as for example a pneumatic control element, the governing effect of which is a function of fluid flow in the element, an intermediate means, such as a valve, is required for converting electrical signals from a photocell into mechanical displacement to control the fluid flow. Although the operation of such mechanisms has been essentially satisfactory, they are nevertheless predisposed to those ills to which mechanical devices are inherently vulnerable and which might affect the "time-keeping" qualities of the shutter. For instance, such effects as thermal deformation of linkages, friction, wear-imposed changes in mechanical clearances, and the deposit of contaminants such as dust or oxidized lubricants at critical points may well result in impairment of the mobility of shutter elements.

Additionally, in regard to many mechanically governed shutters, yet another difficulty exists concerning the practical aspects of picture taking. It is desirable that, in operation, the "time-to-open" interval between the actuation of the shutter mechanism and the opening or uncovering of an exposure aperture be quite brief. Unfortunately, in many such mechanisms long exposures have a substantially longer "time-to-open" interval than do short exposures. Where a wide range of exposure time is desired, the "time-to-open" interval may be impractically long for many associated exposure time values.

Accordingly, one object of this invention is to provide an electromagnetic means for controlling shutter speeds. Another object of this invention is to provide an exposure control device for a shutter mechanism which includes a movable means characterized in that the exposure time of said mechanism is a function of the speed of movement of said movable means, said control device comprising an electromagnetic means having a first magnetic field associated therewith and having means movable within said first magnetic field responsively with movement of said movable means for inducing a second magnetic field, said magnetic fields interacting for controlling the speed of movement of said movable means. Other objects of this invention are to provide such an exposure control device wherein the "time-to-open" interval is in the order of magnitude of the shortest desired exposure interval; to provide a photoresponsive exposure control mechanism wherein the electrical signals from a photosensitive means variably cooperate with a magnetic field force which acts upon a shutter means for controlling shutter speed; to provide a photoresponsive exposure control mechanism comprising a photosensitive means for producing electrical signals in accordance with the intensity of light incident thereon, means for defining an exposure aperture, a shutter means mounted for uncovering and covering movement relative to said aperture, exposure time through said aperture being a function of the speed of said uncovering and covering movement, and electromagnetic means cooperating with said shutter means responsively to said electrical signals for controlling the speed of said movement; to provide a photoresponsive exposure control mechanism comprising, in combination, a photosensitive means for producing electrical signals in accordance with the intensity of light incident thereon, means for defining an exposure aperture, a shutter means mounted for movement in sequence between a first position wherein said shutter means completely covers said aperture, a second position wherein said shutter means uncovers said aperture and a third position wherein said shutter means again covers said aperture, said shutter means being movable from said second to said third position during a variable time interval, means for accelerating said shutter means to at least the highest speed required to effect a desired exposure time interval and during movement of said shutter means from said first position to said second position, and control means for varying shutter speeds responsively to said electrical signals, thereby varying said time interval, said control means comprising an electromagnetic means which is electrically coupled with said photoelectric means, said electromagnetic means comprising a first element having a magnetic field and a conducting element disposed within said field, one of said elements being so connected with said shutter means as to be movable therewith with respect to the other of said elements, said conducting element so cooperating with said magnetic field that said movement of said shutter means is governed by the electromagnetic coupling of said field and said conducting element responsively to said electrical signals.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Generally, this invention relates to shutter mechanisms utilizing an electromagnetic apparatus for a speed governing device in distinction to those shutter speed controls which employ a mechanical control system. The term "electromagnetic" as used herein is to be construed as the interaction of electricity and magnetism in the "mechanical" sense and not, for instance, as used in the phase "electromagnetic radiation." An electromagnetically controlled shutter mechanism is particularly well adapted for use as a photoresponsive shutter mechanism wherein the controlling parameter comprises the electrical signals produced by a photosensitive means in accordance with the intensity of light incident thereon. With the use of electromagnetic control of shutter speed in photoresponsive shutter mechanisms, one may dispense with amplifiers, both electrical and mechanical, and generally with intermediate translating devices which hitherto have been necessary to convert the photocell output to a useful form. Additionally, other auxiliary devices, such as switches to cut out photocell current during exposure or restraining devices to hold the speed control in a fixed position during exposure, may no longer be needed.

The present invention comprehends a shutter mechanism for a photographic device, said mechanism comprising means for defining an exposure aperture, and a shutter element such as a blade cooperating with the exposure aperture to establish an exposure time interval therethrough, the interval being a function of the speed of the shutter element. Means are provided for imparting an aperture-uncovering movement to the shutter element. As a means for controlling the speed of the aperture-uncovering movement of the shutter blade there is provided an electromagnetic element, a portion of which is movable responsively with the shutter blade. The controlling effect of the electromagnetic element may be varied by manual adjustment. In the preferred embodiment of the present invention, there may be associated with the shutter mechanism a photosensitve means such as any of the photovoltaic or photoconductive cells known in the art. In the latter event, the electromagnetic element is so electrically coupled with the photosensitive means as to be responsive to the electrical output thereof and consequently the element governs the speed of movement of said portion of the shutter blade in accordance with the intensity of light incident upon the photosensitive means.

Fundamentally, the electromagnetic element comprises a magnetic element with which a first magnetic field may be associated, the magnetic element preferably comprising a permanent magnet having a permanent magnetic field. Disposed within said first field is an electrically conducting member, either or both the electrically conducting member and the magnetic element being movable with respect to one another. The current induced by relative movement of the electrically conducting element perpendicularly to the first magnetic field is, according to well known physical laws, proportional to the speed of relative movement, the cross-sectional area and the conductivity of the electrically conducting member and the strength of said field, and is in a direction such that a transient magnetic field associated with the current is opposed to the first magnetic field of the magnetic element, thereby providing an opposition of forces or coupling which is used in the present invention to control the speed of the shutter blade.

It has been noted that one of the difficulties in shutter speed control devices lies in the "time-to-open" interval. Where the desired exposure is comparatively short, for example, in the nature of 1/1000 of a second, generally the speed of the shutter blade is comparatively fast. In reaching the fast speed, the blade, moving across a distance from the rest position to the open position with respect to the aperture, may be accelerated rapidly and hence traverse the distance in a comparatively short time interval. However, where a comparatively long exposure is desired, the relation between long and short exposures, for instance, being approximately in the ratio of 100 to 1, the small acceleration required to bring the blade to the slow speed may result in the blade traversing the distance between the rest position to the open position in a comparatively long interval. Because of the real possibilities that the subject matter may alter its position during such long interval, that the alignment of the photographic device relative to the subject may shift during the long interval, or that the operator generally tends to move the camera almost immediately following actuation, the undesirability of a prolonged "time-to-open" interval is apparent. The problem becomes aggravated when a control device, as herein contemplated, is attached to the shutter blade. One form of the present invention therefore comprehends the use of a means for accelerating the shutter blade to a speed substantially greater than the necessary speed to attain the shortest exposure interval, the acceleration being completed within the "time-to-open" interval and the electromagnetic control then being used to reduce the comparatively high speed to the speed level for attaining the desired exposure time interval. Thus, for the longest exposure intervals, for instance, one-quarter second, the "time-to-open" interval will be of the same order of magnitude, i.e., not substantially longer than one-quarter second.

Figures 1, 2, 3, 4, 5:
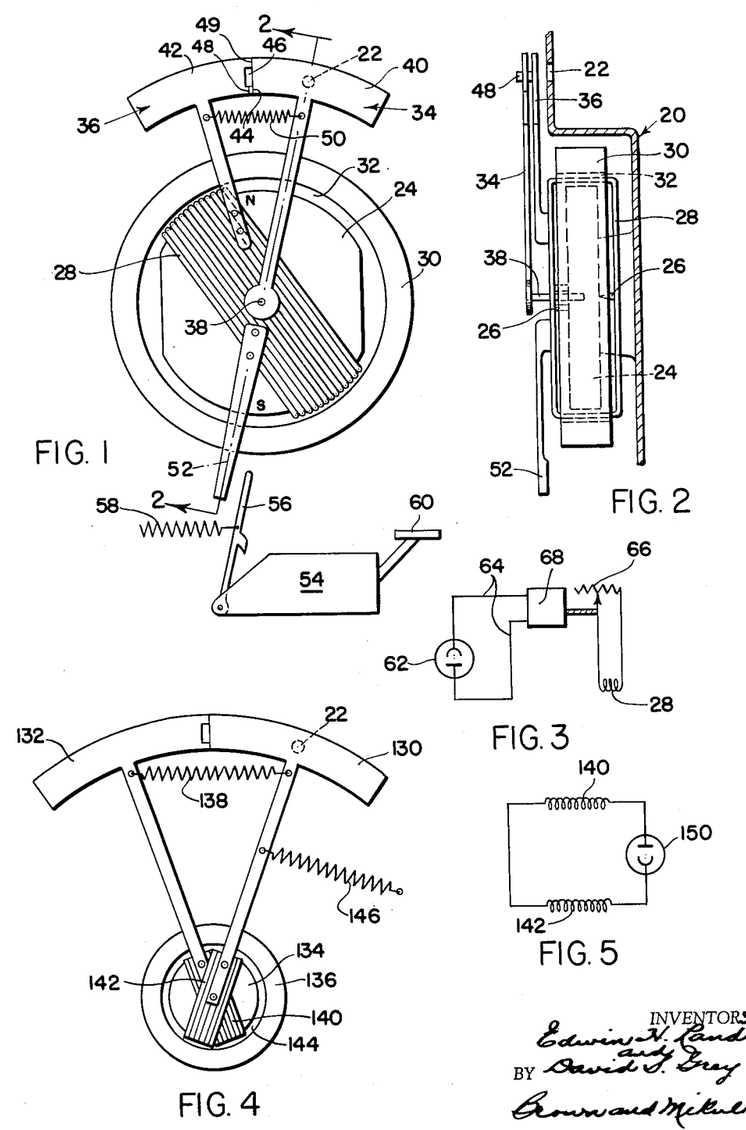
FIGURE 1 is a schematic plan view of a mechanism embodying the invention.
FIG. 2 is a cross-section taken along the line 2—2 of FIGURE 1.
FIG. 3 is a schematic view of a circuit employable with the mechanism of FIGURE 1.
FIG. 4 is a schematic plan view of another embodiment of this invention.
FIG. 5 is a schematic view of a circuit for use with the mechanism of FIG. 4.

Shutter mechanisms having an electromagnetic shutter speed control means may be in a variety of forms, a number of which are disclosed in the copending application Serial No. 735,484, filed May 15, 1958, by David S. Grey, for "Photographic Shutter Mechanism." Referring now to the drawings wherein like numerals denote like parts, one form of the invention is shown in FIGS. 1 through 3, wherein the elements of the invention are shown schematically. In FIG. 2 there is shown a housing means generally indicated at 20 and in which is disposed an exposure aperture 22. Mounted on housing 20 adjacent aperture 22 is an electromagnetic exposure control means which comprises a magnetic element such as a permanent magnet 24, the magnetic element being characterized in that a magnetic field may be associated therewith. In the preferred embodiment this magnetic field is substantially stable in direction and intensity and will be henceforth referred to as the permanent field. Permanent magnet 24 comprises, for example, an approximately cylindrical bipolar element with perpendicularly truncate ends, the poles being designated arbitrarily at "N" and "S" and the magnetic lines of flux of the permanent field being substantially perpendicular to the faces of the designated poles. Permanent magnet 24 may be composed of any of the permanently magnetized ferromagnetic alloys, as for example "Alnico VI," having a large coercive force and high retentivity. Longitudinally engirdling magnet 24 and pivotally mounted at the truncate ends of magnet 24 by suitable mounting means such as pivots 26 is an electrically conducting member such as coil 28 which is adapted for rotation in a plane normal to the longitudinal axis of and about the approximately circular periphery of magnet 24. Coil 28 is preferably composed of a metal such as copper or aluminum and has at least one complete turn of approximately 360°. The coil may assume a variety of shapes, preferably being adapted to match the configuration of magnet 24. The longitudinal axis of magnet 24 is preferably substantially equal to its own cylindrical diameter in order that the greater bulk of coil 28 be so disoposed within the permanent field of magnet 24 as to be rotatable about pivots 26 substantially perpendicularly to the magnetic flux of the permanent field. As a means for conducting and intensifying the flux of the permanent field, there is provided a means such as ring 30 which is mounted on housing 20 and so disposed peripherally about the approximate circular configuration of magnet 24 that coil 28 is freely rotatable between said ring and said magnet. It is preferred that ring 30 be disposed with the closest possible tolerance to magnet 24 commensurate with the free rotatability of coil 28 inasmuch as the intensity of magnetic field in gap 32, provided by the separation of ring 30 and magnet 24, is an inverse function of said separation. Ring 30 may be composed of any of the ferromagnetic metals or alloys, for example soft iron, in which a magnetic flux path may be established and which exhibits low reluctance. For shielding gap 32 from stray magnetic fields and for providing uniformity of the permanent magnetic field in the vicinity of coil 28, the longitudinal length of ring 30 may be so constructed as to be equal to or slightly greater than the width of permanent magnet 24. However, weight considerations comprise an important element in determining flux ring dimensions and would therefore require the smallest flux ring commensurate with proper function.

As a means for covering and uncovering exposure aperture 22 there is provided a shutter element which, in the embodiment shown in FIGURES 1 and 2, comprises a double member such as independent blade 34 and controlled blade 36. Independent blade 34, in the form shown, comprises a longitudinal member pivotally mounted at one end thereof upon magnet 24 by suitable bearing means such as pivot 38, pivot 38 being, in the form shown, disposed coaxially with the pivotal axis of movable coil 28. Independent blade 34 includes a planar covering portion 40, covering portion 40 being disposed in a normally covering relation to aperture 22 and being adapted for rotation in a plane perpendicular to the optic axis of aperture 22 between a first or rest position wherein covering portion 40 completely covers aperture 22 and a second or displaced position wherein covering portion 40 completely uncovers aperture 22. Independent blade 34 may also include means for counter-weighing covering portion 40 if desired.

Controlled blade 36 comprises a longitudinal member, one end of which is preferably so rigidly attached to coil 28 as to be movable therewith for rotation in the same plane as independent blade 34. Disposed at the opposite end of controlled blade 36 is planar portion 42 which is preferably adapted for movement in a plane parallel to and closely adjacent the plane of movement of covering portion 40 of independent blade 34 and is movable between a rest position wherein it lies to one side of aperture 22 and a covering position wherein it completely covers said aperture. Planar portion 42 is so shaped as to be substantially greater in all dimensions than the cross-sectional area of aperture 22 and has a greater dimension disposed tangent to its arc locus of rotation. Edge 44 of planar portion 42 is provided therein with an opening such as slot 46 which is so disposed as to overlie aperture 22 during a portion of its movement from rest position to covering position and is so dimensioned as to provide a minimum opening in the double member for controlling exposures through aperture 22. Extending perpendicularly from edge 44 of planar portion 42 and so disposed in the arcuate path of rotation of independent blade 34 that said blades cannot completely overlie one another, is a means, such as tab 48, for imparting rotational movement to the independent blade. Independent blade 34 and controlled blade 36 when in their rest positions are so disposed relative to one another that when independent blade 34 is in the first position, covering portion 40 of independent blade 34 abuts tab 48. Tab 48 is preferably so disposed on planar portion 42 that when covering portion 40 of independent blade 34 abuts tab 48, abutting edge 49 of covering portion 40 so overlaps edge 44 of planar portion 42 as to provide a light-tight seal without covering slot 46.

As a means for coupling independent blade 34 with controlled blade 36 and as a means for releasably and resiliently retaining said blades in abutting position, there is provided a means such as torsion spring 50 which is shown anchored at its extremities respectively at the independent blade and the controlled blade. Other means for retaining said blades in abutment may be provided such as a hairspring mounted at pivot 38 and so disposed as to urge independent blade into abutment with tab 48, or in the form of a torsion spring similar to spring 50 but anchored instead to controlled blade 36 and housing 20. In order to insure a ready angular separability between blade 34 and blade 36, the means for releasably retaining said blades in abutment should exert a force which is considerably weaker than the force employed in rotating the independent blade from the first position to the second position. Additionally, in order that, in the preferred embodiment, the force of the releasable retaining means be exerted substantially equally upon the blades, the inertia of the independent blade may be matched with the inertia of the controlled blade.

For rotating coil 28 about its pivotal axis, there is provided a means such as arm 52 which is preferably rigidly attached to coil 28 and extends therefrom oppositely to and preferably in the plane of rotation of independent blade 34. As a means for imparting a force for rotating coil 28 and associated controlled blade 36 as well as independent blade 34 there are provided means which may be of the general type described in U.S. Patent No. 2,531,936, which patent discloses a means for imparting an aperture-uncovering movement to a shutter blade of the "free-moving" type, by use of a striking member which delivers an impact under the bias of a driving spring. As so described, such a means for imparting an aperture-uncovering movement is preferably utilized with the mechanism herein disclosed, such means being designated generally at 54. Shown extended from said means is a rotatable impulse member 56 which is so disposed relative to arm 52 as to impart a rotational movement to said arm when the impulse member is rotated under the bias of a resilient means such as spring 58. For actuating means 54 there is shown an actuating arm 60 extending therefrom, arm 60 being adapted for manual manipulation by an operator to actuate the shutter mechanism. It is, of course, desirable that the force imparted by impulse member 56 to arm 52 be greatly in excess of the force exerted by linear spring 50.

As a means for variably adjusting the controlling force of the electromagnetic means heretofore described, there may be used to complete a circuit between the terminals of coil 28 a variable electrical impedance, the magnitude of which may be manually determined by an operator of the mechanism. However, it is preferred that the means for adjusting the controlling force be automatically responsive to the luminous intensity of the field of view of a photographic device embodying the invention. Consequently, in FIG. 3 there is shown a diagram of one form of a circuit which comprises a photoelectric cell 62 preferably of the photovoltaic variety, which cell produces electrical signals in proportion to the intensity of light incident thereon. Leads 64 are provided for introducing said signals into a means for variably adjusting an electrical impedance such as resistor 66 responsively to said signals, which variable impedance adjusting means is designated generally at 68 and which may comprise any of the several devices of this kind known to the art. Moving coil 28 is preferably electrically coupled in series with resistor 66.

Before describing other embodiments of this invention, a brief discussion of the operation of the mechanism shown and heretofore described will be helpful.

Actuation by an operator of the means 54 for imparting an aperture-uncovering movement releases impulse member 56 which strikes arm 52 thereby rotating arm 52 and attached coil 28 in a clockwise direction. The rotation of coil 28 so moves longitudinal portions thereof perpendicularly to the magnetic flux of magnet 24 as to induce a current in the coil, the direction of the current being such that the force of the induced magnetic field associated with the induced current is opposite in direction to the "permanent" field of magnet 24. The magnitude of the induced field is determined by such factors as the intensity of the "permanent" field, the electrical resistance of coil 28 and the speed of movement of coil 28 relative to magnet 24.

The rotational movement of coil 28 and consequently of controlled blade 36 is transmitted to independent blade 34 through tab 48, both blades thereby rotating in a clockwise direction from rest position. The speed of rotation of independent blade 34 is determined primarily by the accelerating force thus imparted, the inertial mass of the independent blade and the frictional characteristics of pivot 38. The speed of rotation of controlled blade 36 is determined by similar factors but also includes the counter-effect of the induced field interacting with the permanent field, i.e., the product of the magnitudes of the two fields, as well as the force exerted by spring 50 acting counter to the retarding effect of the coupled fields. Spring 50 also functions in maintaining the blades in abutment with one another when in rest position or during movement of the blades in the event of a zero induced field.

The counter-effect of the induced field acts, in this embodiment, as a brake upon the movement of controlled blade 36 and hence causes the controlled blade to lag behind the independent blade. The angular separation of the blades occasioned by the lag of the controlled blade is thus a function of the intensity of the induced field. It should be noted that short circuit of the terminals of coil 28 results in a maximum current flowing during movement of the coil, hence a maximum induced field. On the other hand, introducing into the circuit of the coil, for example, an essentially infinite resistance, creates an effectively open circuit and results in essentially no current flowing during movement of the coil, the field induced thereby being a minimum or zero. These two states then represent the limits of induced field intensity as controlled by the introduction of variable impedance 66 in circuit.

Light, incident upon photocell 62, produces signals proportionate thereto, the signals then actuating the variable impedance control 68 for accordingly varying the impedance 66 introduced into the coil circuit and for controlling the speed of movement of controlled blade 36. As the speeds of movement of the blades of the shutter element across aperture 22 establish exposure time therethrough and determine the angular separation between the blades, the exposure interval is therefore a function of the angular separation and hence a function of the intensity of light incident upon photocell 62.

It being desirable that the controlling effect of the electromagnetic means occur during movement of the portions of coil 28 in those portions of gap 32 wherein permanent magnetic field intensity is at a maximum, it should be noted that the braking effect produced by the electromagnetic means may be relatively minimal at the beginning of the movement of coil 28 from the rest position. Consequently, the accelerating force imparted by impulse member 56 will readily accelerate coil 28 and associated blades 34 and 36 to a comparatively high speed within a short time interval and previously before independent blade 34 uncovers aperture 22. At a predetermined position before the independent blade uncovers aperture 22, the position of coil 28 is such that the braking effect of the electromagnetic means is at a maximum for the desired exposure and hence reduces the speed of controlled plate 36 to the desired level. The same acceleration and same maximum velocity may be utilized with a variable braking effect to obtain a wide range of shutter speeds while yet maintaining a comparatively constant "time-to-open" interval.

Figure 6:
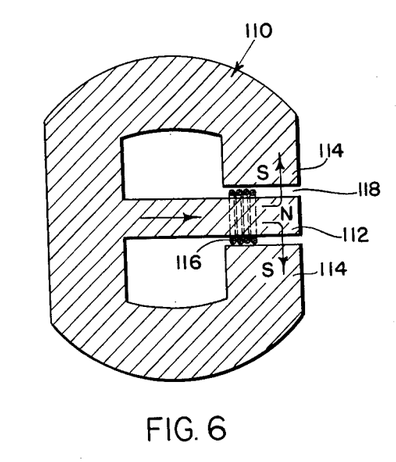
FIG. 6 is a schematic cross-section of one form of magnetic element of the invention.

In FIG. 6 is shown a magnetic element in an alternative embodiment of an electromagnetic control means. The magnet element shown in cross section comprises a permanent magnet 110 in which one pole 112 is disposed concentrically with respect to the other pole 114. The direction of the lines of magnetic flux are as indicated by the arrows. Cooperating with magnet 110 is a coil 116 disposed for axial movement along the periphery of the internal pole 112 in the gap 118 provided by the spacing of external pole 114 from internal pole 112. This embodiment provides the advantage of confining the entire magnetic flux within the magnet, dispenses with a flux-conducting means such as a ring and is readily adaptable for use with shutter blades which are adapted for translatory motion as opposed to the pivotal type of shutter blade described herein. As a practical matter, it might prove inefficient to use such a magnet. In such event, internal pole 112 in its entirety might comprise a single magnet, the remainder of the element then constituting a flux-conducting member without materially altering the operation of the mechanism.

Figure 7:
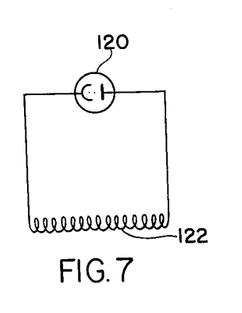
FIG. 7 is a schematic view of another form of an electrical circuit of the invention.
Figure 8:
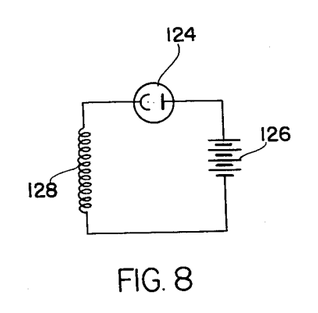
FIG. 8 is a schematic view of yet another form of an electrical circuit of the invention.

In FIGS. 7 and 8 are shown alternative embodiments of the circuit of the mechanism heretofore disclosed, which circuit comprises a movable coil and a photosensitive means. In FIG. 7 is shown a photosensitive means such as photovoltaic cell 120 which is so coupled with movable coil 122 that the output of cell 120 is of opposite polarity to the current induced in movable coil 122. With suitable magnitudes of photocell current and induced current, the retarding force which is due to the induced current may be modified in accordance with variations in photocell current due to changes in light intensity incident upon the photocell. In FIG. 8 is shown another form of the circuit wherein the photosensitive means comprises a photoconductive cell 124, for controlling the current supplied by an electric power source such as battery 126, battery 126 being so introduced into the circuit that the controlled current is opposite in polarity to and smaller in magnitude than the maximum current inducible in movable coil 128.

In the embodiments of this invention previously described herein, the electromagnetic control means has been shown for controlling the speed of movement of a shutter element by the braking or retarding effect of magnetic field interaction, the electromagnetic means being used, in a sense, as a generator. The electromagnetic means may also be employed as a "motor" means for moving the shutter element at variable speeds.

Such a "motor" is disclosed in the embodiment of FIG. 4 and comprises such elements as independent blade 130, controlled blade 132, magnet 134, flux ring 136, spring 138, and first coil 140 to which is attached controlled blade 132, the construction of these elements being substantially similar to their counterparts as described in detail in connection with FIG. 1. It may be seen that in FIG. 4 independent blade 130 is mounted upon an electrically conducting member, such as second coil 142, which is preferably mounted coaxially with first coil 140 for pivotal movement about magnet 134, independently of first coil 140, within the gap 144 provided by the separation of magnet 134 and ring 136. As a means for moving independent blade 130 there is provided a resilient element such as spring 146, the extremities of which are respectively anchored to a portion of independent blade 130 and to the housing [not shown]. In distinction to the embodiments shown in FIGS. 1 and 2, the independent blade 130 preferably has a mass greatly in excess of the mass of controlled blade 132. Consequently, spring 146 need provide a spring force of sufficient magnitude to move the combined masses of the independent blade 130 and second coil 142 against any possible retarding effect created by the coupling of the permanent field of magnet 134 with any induced field in second coil 142. Spring 138, which is shown connecting independent blade 130 and controlled blade 132, possesses only enough resiliency to maintain the two blades in abutment when in rest position and essentially serves the same purpose as its counterpart spring 50 shown in FIG. 1.

In FIG. 5 is shown an electrical circuit which comprises part of the mechanism of FIG. 4 and includes a photosensitive means such as a photoconductive cell 150 which is preferably disposed in series with first coil 140 and second coil 142. In operation, movement of independent blade 130 under the bias of spring 146 rotates second coil 142 in the gap 144 between ring 136 and magnet 134, thereby inducing a current in the second coil. The current so induced is modified by the action of photoconductive cell 150 which acts as a resistance means, the magnitude of which is an inverse function of the intensity of light incident thereon. The modified current from second coil 142 is then introduced into first coil 140 to induce a transient field therein for interacting with the permanent field of magnet 134 to rotate controlled blade 132 about its pivotal axis. At minimum light intensity incident on photocell 150, the motive current supplied to first coil 140 is also minimal, hence the rotation of controlled blade 132 will lag substantially behind the rotation of independent blade 130. At high light intensity, the motive current supplied will rotate first coil 140 at a substantially higher speed, hence decreasing the lag or angular separation between the blades. As the exposure time through aperture 22 is a function of the angular separation between the blades, the exposure times are variable in accordance with the intensity of light.

Numerous modifications of the latter embodiment may be made; for instance, individual magnets and corresponding flux-conduction and intensification means may be provided for each of the coils attached to the respective blades. Additionally, independent blade 130 need not be mounted upon a rotating coil, but may be simply pivoted upon bearing means as described in connection with FIG. 1, and a separate source of motive power, such as a generator or battery, may be introduced into the circuit in place of second coil 142 with an appropriate switching means for actuating the power source synchronously with the actuation of other elements of the shutter mechanism. In the latter event, the mechanism may be modified in that the double member shutter element may be replaced with a shutter element comprising a unitary blade having an opening therein.

Mechanisms schematically shown in the drawings indicate a plurality of elements which are in the preferable form for performing various functions as hereinbefore described. However, it will be evident that certain of these elements may be readily altered in form or interchanged with further modification and that numerous other elements could be employed wtihin the scope of the invention to perform similar functions. For instance, means for setting the shutter mechanisms and means for releasing said shutter mechanisms are well known in the art and have, on the whole, been omitted. Also, in some forms, the double member shutter means may be replaced with a single blade having an opening therein. It is also readily apparent that the within invention may be adapted for use with a wide variety of other photographic elements such as means for limiting effective exposure aperture areas such as diaphragms of various types. It should be particularly noted that most of the forms of the mechanisms herein disclosed include a means for accelerating a shutter blade to an initially high speed for providing a substantially constant "time-to-open" interval. Although the mechanisms are operational without such an accelerating means, the inclusion of such a means is greatly preferred as it contributes to maintain the approximate invariance of the "time-to-open" interval and substantially enlarges the range of exposure values attainable.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An exposure control device for a photographic shutter mechanism which includes a movable shutter blade, the exposure time of said shutter mechanism being determined by the speed of movement of said shutter blade, said control device comprising an electromagnetic means which includes a magnetic element having a first magnetic field associated therewith, an electrically conducting element disposed in said first field, one of said elements being attached to said shutter blade for movement therewith and relative to the other of said elements, the relative movement of said elements causing a current to be induced in said electrically conducting element, said current having associated therewith an induced second magnetic field which interacts with said first field, whereby the speed of said relative movement is a function of the product of the magnitudes of said first and second fields, and means for controlling said product for varying said speed of relative movement and thereby said exposure time.

2. An exposure control device as defined in claim 1 wherein said conducting element comprises an electrical coil having at least one turn.

3. An exposure control device as defined in claim 1 wherein said magnetic element comprises a permanent magnet and which includes a flux-conducting means for cooperating with said magnet.

4. An exposure control device for a photographic shutter mechanism which includes a movable shutter blade, the exposure time of said shutter mechanism being determined by the speed of movement of said shutter blade, said control device comprising an electromagnetic means which includes a magnetic element having a first magnetic field associated therewith and an electrically conducting element disposed in said first field, one of said elements being attached to said shutter blade for movement therewith and relative to the other of said elements, the relative movement of said elements causing a current to be induced in said electrically conducting element, said current having associated therewith an induced second magnetic field which interacts with said first field, whereby the speed of said relative movement is a function of the product of the magnitudes of said first and second fields, photosensitive means the electrical properties of which vary in accordance with the intensity of light incident thereon, and means for controlling said product for varying said speed of relative movement and thereby said exposure time in accordance with said electrical properties.

5. An exposure control device as defined in claim 4 wherein said means for controlling the product of the magnitudes of said fields comprise an electrical impedance connected in series with said electrically conducting element, and means for variably controlling the magnitude of said electrical impedance in accordance with said electrical properties.

6. An exposure control device as defined in claim 5 wherein said impedance comprises a resistor.

7. An electromagnetically controlled shutter mechanism comprising, in combination, housing means having an exposure aperture therein, a shutter means comprising a first shutter member and a second shutter member, said first shutter member being pivotally mounted adjacent said exposure aperture in covering position relative thereto and for substantially free rotary movement between said covering position and a displaced position wherein said aperture is uncovered, said second shutter element being pivotally mounted adjacent said exposure aperture in an uncovering position relative to said aperture for movement between said uncovering position and a second position wherein said exposure aperture is completely covered, the exposure time through said aperture being a function of the angular separation between and the speed of movement of said shutter elements, means for imparting an aperture-uncovering movement to said first shutter element for moving said first shutter element from said covering position to said displaced position and for imparting an aperture-covering movement to said second shutter element for moving said second shutter element from said uncovering position to said second position, electromagnetic means including a magnetic element having a magnetic field associated therewith and a flux-conducting means so disposed peripherally about said magnetic element as to provide a gap between said element and said flux-conducting means, an electrically conducting member disposed for rotary movement in said gap perpendicular to the magnetic field of said magnetic element, said electrically conducting member being attached to said second shutter element and movable therewith, and a photosensitive means for producing electrical signals in accordance with the intensity of light incident thereon, said photosensitive means being so electrically coupled with said electrically conducting member that the speed of movement of said second shutter element is responsive to said electrical signals, the angular separation between said elements during movement thereof being a function of said electrical signals.

8. An electromagnetically controlled shutter mechanism comprising, in combination, housing means having an exposure aperture therein, a shutter means comprising a first shutter member and a second shutter member, said first shutter member being mounted adjacent said exposure aperture in covering position relative thereto for movement between said covering position and a displaced position wherein said aperture is uncovered, said second shutter element being mounted adjacent said exposure aperture in an uncovering position relative to said aperture for movement between said uncovering position and a second position wherein said exposure aperture is completely covered, the exposure time through said aperture being a function of the angular separation between and the speed of movement of said shutter elements, electromagnetic means including a magnetic element having a magnetic field associated therewith, a first electrically conducting member disposed for movement perpendicular to the magnetic field of said magnetic element and being connected to said first shutter element, a second electrically conducting member disposed for movement perpendicular to the magnetic field of said magnetic element and being connected to said second shutter element, means for so moving said first shutter element from said covering position to said displaced position that a current is induced in said first electrically conducting member, a photosensitive means coupled with said first electrically conducting member for varying said current in accordance with the intensity of light incident upon said photosensitive means, and means for so electrically coupling said photosensitive means and said first conducting member with said second conducting member that said current is introduced into said second conducting member for moving said second conducting member and said second shutter element from said uncovering position to said second position.

9. An exposure control device for a photographic shutter mechanism which includes a movable shutter blade, the exposure time of said shutter mechanism being determined by the speed of movement of said shutter blade, said control device comprising an electromagnetic means which includes a magnetic element having a first magnetic field associated therewith, an electrically conducting coil disposed in said first field, said shutter blade being attached to said coil for movement therewith, means for imparting movement to said coil relative to said first field whereby a current is induced in said coil, said current having associated therewith an induced second magnetic field, which interacts with said first field, whereby the speed of said relative movement is a function of the product of the magnitudes of said first and second fields, and means for controlling said product for varying said speed of relative movement and thereby said exposure time.

10. An exposure control device for a photographic shutter mechanism which includes a movable shutter blade, the exposure time of said shutter mechanism being determined by the speed of movement of said shutter blade, said control device comprising an electromagnetic means which includes a magnetic element having a first magnetic field associated therewith, flux-conducting means so disposed adjacent said magnetic element as to provide a space therebetween, an electrically conducting element disposed for movement in said space, said shutter blade being attached to said conducting element for movement therewith, means for imparting movement to said conducting element relative to said first field whereby a current is induced in said conducting element, said current having associated therewith an induced second magnetic field which interacts with said first field, whereby the speed of said relative movement is a function of the product of the magnitudes of said first and second fields, and means for controlling said product for varying said speed of relative movement and thereby said exposure time.

11. An electromagnetically controlled shutter mechanism comprising, in combination, housing means having an exposure aperture therein, a shutter means movable between covering and uncovering positions relative to said aperture for effecting an exposure therethrough, the exposure time of said shutter mechanism being determined by the speed of movement of said shutter means, electromagnetic means including a magnetic element having a first magnetic field associated therewith, an electrically conducting element disposed in said first field, one of said elements being attached to said shutter means for movement therewith and relative to the other of said elements, the relative movement of said elements causing a current to be induced in said conducting element, said current having associated therewith an induced second magnetic field which interacts with said first magnetic field whereby the speed of said relative movement is a function of the product of the magnitudes of said first and second fields, photosensitive means the electrical properties of which vary in accordance with the intensity of light incident thereon, and means for controlling said product for varying said speed of relative movement and thereby said exposure time in accordance with said electrical properties.

12. An electromagnetically controlled shutter mechanism as defined in claim 11 wherein said means for controlling said product comprises an electrical impedance connected in series with said conducting element, and means for variably controlling the magnitude of said impedance in accordance with said electrical properties.

13. An electromagnetically controlled shutter mechanism as defined in claim 11 wherein said photosensitive means comprises a photovoltaic element so electrically coupled with said conducting element that the current produced thereby is opposite in polarity to said current induced in said conducting element.

14. An electromagnetically controlled shutter mechanism as defined in claim 11 wherein said photosensitive means comprises a photoconductive element, said shutter mechanism including an electrical power source so electrically coupled in series with said photoconductive element that the polarity of said source is opposite to the polarity of said current.

15. An electromagnetically controlled shutter mechanism comprising, in combination, housing means having an exposure aperture therein, shutter means movable between covering and uncovering positions relative to said aperture effecting exposures therethrough, the exposure time of said shutter mechanism being determined by the speed of movement of said shutter means, an electromagnetic means including a permanent magnet having a first magnetic field associated therewith and an electrically conducting element disposed for translatory movement normal to said first field, said conducting element being attached to and movable with said shutter means, said translatory movement causing a current to be induced in said conducting element, said current having associated therewith an induced second magnetic field which interacts with said first field, whereby the speed of said translatory movement is a function of the product of the magnitudes of said first and second fields, photosensitive means the electrical properties of which vary in accordance with the intensity of light incident thereon, said photosensitive means being electrically coupled with said conducting element for controlling the magnitude of said current in accordance with said electrical properties.

16. A shutter for a photographic device, comprising means providing an exposure aperture, a shutter means adapted for movement with respect to said aperture in uninterrupted sequence from a first position wherein said shutter means completely covers said aperture through a second position wherein said shutter means just uncovers said aperture to a third position wherein said shutter means just completely covers said aperture, means for moving said shutter means from said first position to said third position, electromagnetic means for controlling the speed of movement of said shutter means from said second position to said third position for variably establishing an exposure time interval within a predetermined range of exposure time intervals, said shutter including means for accelerating said shutter means from said first position to said second position to a speed substantially greater than the maximum speed necessary to effect the shortest exposure time interval of said predetermined range, said electromagnetic means comprising means for reducing said substantially greater speed to the speed necessary for obtaining a desired exposure time interval, said electromagnetic means including a magnetic element having a first magnetic field associated therewith, an electrically conducting element disposed in said first field, one of said elements being movable in response to motion of said shutter means and with respect to the other of said elements for inducing a second magnetic field associated with said conducting element and means for controlling the product of the magnitudes of said fields for varying said exposure time by braking the speed of said shutter means from said maximum speed.

17. A shutter as defined in claim 16, wherein said means for accelerating said shutter means comprises a spring-loaded member for imparting an impulse to said shutter means.

18. A shutter as defined in claim 16, wherein said means for accelerating said shutter means comprises a spring member.

19. A shutter for a photographic device, comprising means providing an exposure aperture, a shutter means mounted for movement with respect to said aperture over a distance from a first position wherein said shutter means fully covers said aperture through a second position wherein said shutter means just uncovers said aperture to a third position wherein said shutter means just fully covers said aperture, means for moving said shutter means from said first position to said third position, electromagnetic means for controlling the speed of movement of said shutter means from said second position to said third position for establishing a range of exposure time intervals of said shutter, said shutter including means for accelerating said shutter means from said first position to said second position to a speed substantially greater than the maximum speed necessary to effect the shortest time interval within said range and within a time interval which is of a substantially same order of magnitude as a desired exposure time interval, photosensitive means for producing electrical signals in accordance with the intensity of light incident thereon, said electromagnetic means including a magnetic element and a conducting element so disposed for movement relative to one another that a current is inducible in said conducting element during movement of said elements relative to one another, one of said elements being attached to and movable with said shutter means, said photosensitive means being electrically coupled with said conducting element for controlling responsively to said signals the magnitude of said current induced in said conducting element.

20. A shutter for a photographic device, comprising means providing an exposure aperture, a shutter means mounted for movement with respect to said aperture over a distance from a first position wherein said shutter means fully covers said aperture through a second position wherein said shutter means just uncovers said aperture to a third position wherein said shutter means just fully covers said aperture, means for moving said shutter means from said first position to said third position, electromagnetic means for controlling the speed of movement of said shutter means from said second position to said third position for establishing a range of exposure time intervals of said shutter, means for accelerating said shutter means from said first position to said second position to attain at the latter a speed substantially greater than the maximum speed necessary to effect the shortest exposure time interval of said range and within a time interval which is of a substantially same order of magnitude as a desired exposure time interval, said electromagnetic means including a movable permanent magnet and a movable coil so disposed for movement relative to one another that a current is inducible in said coil during movement of said magnet and said coil relative to one another, one of said magnet and said coil being attached to and movable with said shutter means, and an electrical circuit for controlling the magnitude of said current inducible in said coil, said circuit comprising a photosensitive means for producing electrical signals in accordance with the intensity of light incident thereon, and means electrically coupled with said coil and with photosensitive means and being responsive to said electical signals for varying the impedance of said circuit of said coil in accordance with said signals.

21. A shutter for a photographic device, comprising means providing an exposure aperture, a shutter means mounted for movement with respect to said aperture in sequence from a rest position wherein said shutter means fully covers said aperture through a second position wherein said shutter means just uncovers said aperture to a third position wherein said shutter means just fully covers said aperture, means for moving said shutter means from said first position to said third position, electromagnetic means for controlling the speed of movement of said shutter means from said second position to said third position for establishing an exposure time interval within a predetermined range of exposure time intervals, means for accelerating said shutter means from said first position to said second position to attain at the latter a speed substantially greater than the maximum speed necessary to effect the shortest time interval of said range and within a time interval which is of a substantially same order of magnitude as a desired exposure time interval, said electromagnetic means comprising a magnetic element having a magnetic field associated therewith, a conducting element disposed in said magnetic field, said magnetic element being attached to and movable with said shutter means and with respect to said conducting element for inducing a current in said conducting element, and means for varying the magnitude of said induced current for controlling said speed of movement.

22. A shutter as defined in claim 21, including a photosensitive means for producing electrical signals in accordance with the intensity of light incident thereon, said photosensitive means being so coupled with said means for varying the magnitude of said induced current that said induced current is varied in accordance with said electrical signals.

23. An electromagnetically controlled shutter mechanism comprising, in combination, housing means having an exposure aperture therein, a shutter means comprising a first shutter member and a second shutter member, said first shutter member being pivotally mounted adjacent said exposure aperture in covering position relative thereto and for substantially free rotary movement in a predetermined direction between said covering position and a displaced position wherein said aperture is uncovered, said second shutter member being pivotally mounted adjacent said exposure aperture in an uncovering position relative to said aperture for movement in approximately said predetermined direction between said uncovering position and a second position wherein said exposure aperture is completely covered, the exposure time through said aperture being a function of the angular separation between and the speeds of movement of said shutter members, an exposure control device for varying the speed of movement of said second shutter member with respect to said aperture within a predetermined range of speeds, said exposure control device comprising means for accelerating said members during a predetermined time interval to reach just before said first shutter member uncovers said aperture a speed substantially greater than the maximum speed within said speed range, electromagnetic means including a magnetic element having a magnetic field associated therewith and a flux-conducting means so disposed peripherally about said magnetic element as to provide a gap between said element and said flux-conducting means, an electrically conducting member disposed for movement in said gap perpendicular to the magnetic field of said magnetic element, said electrically conducting member being attached to said second shutter member and movable therewith, and a photosensitive means for producing electrical signals in accordance with the intensity of light incident thereon, said photosensitive means being so electrically coupled with said electrically conducting member that said substantially greater speed of movement of said second shutter member is reduced by the electromagnetic coupling of said field with said conducting member responsively to said electrical signals in order to vary the separation between said shutter members and therefore the exposure time interval.

24. A shutter for a photographic device, comprising means providing an exposure aperture, a shutter means mounted for movement with respect to said aperture in sequence from a rest position wherein said shutter means fully covers said aperture through a second position wherein said shutter means just uncovers said aperture to a third position wherein said shutter means just fully covers said aperture, means for moving said shutter means from said first position to said third position, electromagnetic means for variably reducing the speed of movement of said shutter means from said second position to said third position for establishing an exposure time interval within a range of time intervals, means for accelerating said shutter means from said first position to said second position to reach at the latter a speed substantially greater than the maximum speed necessary to establish the shortest exposure time interval within said range and within a time interval which is of a substantially same order of magnitude as said exposure time interval, said electromagnetic means comprising a magnetic element having a magnetic field associated therewith, a conducting element disposed in said magnetic field, said conducting element being attached to and movable with said shutter means and with respect to said magnetic element for inducing a current in said conducting element, and means for varying the magnitude of said induced current for controlling said speed of movement.

25. A shutter as defined in claim 24, including a photosensitive means for producing electrical signals in accordance with the intensity of light incident thereon, said photosensitive means being so coupled with said means for varying the magnitude of said induced current that said induced current is varied in accordance with said electrical signals.

26. A shutter mechanism for a photographic device, comprising means providing an exposure aperture, a shutter means mounted for movement with respect to said aperture in sequence from a rest position wherein said shutter means fully covers said aperture to a second position wherein said shutter means just uncovers said aperture to a third position wherein said shutter means just fully covers said aperture, means for moving said shutter means from said first position to said third position, electromagnetic means for controlling the speed of movement of said shutter means from said second position to said third position for establishing an exposure time interval within a range of exposure time intervals, means for accelerating said shutter means from said first position to said second position to reach at the latter a speed substantially greater than the maximum speed necessary to establish the shortest exposure time interval within said range and within a time interval which is of a substantially same order of magnitude as said exposure time interval, said electromagnetic means comprising an approximately cylindrical permanent magnet mounted upon said means providing an exposure aperture, a flux-conducting ring-like member so disposed about the circular periphery of said magnet as to provide a substantially uniform magnetic field between a portion of said permanent magnet and a portion of said ring-like member, an electrically conducting coil mounted on and disposed about said magnet for pivotal movement in said magnetic field, said coil being connected with and movable in unison with said shutter means for inducing a second magnetic field associated with said coil during movement of said shutter means from said second position to said third position, a photosensitive means for producing electrical signals in accordance with the intensity of light incident thereon, and an electrical circuit for coupling said photosensitive means and said coil for controlling the magnitude of said second magnetic field in accordance with said electrical signals.

27. A shutter mechanism as defined in claim 26, wherein said ring-like member is so disposed about the circular periphery of said magnet as to provide a substantially uniform gap between said portion of said magnet and said portion of said member, said gap having a maximum width sufficient only for allowing free pivotability of said coil therein.

28. A shutter for a photographic device, comprising housing means having an exposure aperture therein, a shutter blade having an opening therein and being mounted on said housing means for movement between a first position wherein said opening lies to one side of said aperture through a second position wherein a minimal portion of said opening overlies a minimal portion of said aperture and a third position wherein said opening lies to an opposite side of said aperture, first resilient means for moving said shutter blade from said first position to said third position for effecting an exposure, the time interval of said exposure being a function of the speed of movement of said shutter blade from said second position to said third position, second resilient means for accelerating said shutter blade from said first position to said second position to reach at the latter a speed substantially greater than the maximum speed necessary to establish the shortest desired exposure time interval and within a time interval which is of a substantially same order of magnitude as said time interval of exposure, electromagnetic means for controlling said speed of movement of said blade, said electromagnetic means comprising a permanent magnet having a first magnetic field associated therewith, an electrically conducting coil disposed in said first magnetic field, said coil being attached to and movable with said shutter blade with respect to said permanent magnet for inducing a second magnetic field associated with said coil, said second magnetic field so cooperating with said first magnetic field that said speed of movement of said shutter blade is controlled by the electromagnetic coupling of said fields, a circuit electrically coupled with said coil for varying the magnitude of said second magnetic field, and photosensitive means for producing electrical signals in accordance with the intensity of light incident thereon and being so coupled with said circuit that said second magnetic field is variable in accordance with said electrical signals.

29. A shutter for a photographic device, comprising means providing an exposure aperture, shutter means mounted for movement with respect to said aperture in uninterrupted sequence from a rest position wherein said shutter means fully covers said aperture through a second position wherein said shutter means just uncovers said aperture to a third position wherein said shutter means just fully covers said aperture, means for moving said shutter means from said first position to said third position, means providing a force for accelerating said shutter means to a speed at least high enough to effect a desired exposure time interval, said force being of magnitude sufficient for accelerating said shutter means to said speed during a time interval which is substantially of the same order of magnitude as said desired exposure time interval, electromagnetic means for providing a force for controlling the speed of movement of said shutter means from said second position to said third position for variably establishing said desired exposure time interval within a predetermined range of exposure time intervals, said electromagnetic means including a magnetic element having a first magnetic field associated therewith, an electrically conducting element disposed in said first field, one of said elements being movable in response to motion of said shutter means and with respect to the other of said elements for inducing a second magnetic field associated with said conducting element, and means for controlling the product of the magnitudes of said fields for providing variations in exposure time intervals.

30. A shutter as defined in claim 29, wherein the force provided by said electromagnetic means is opposed to the force for accelerating said shutter means thereby constituting means for braking the speed of movement of said shutter means.

References Cited in the file of this patent

UNITED STATES PATENTS

| | | |
|---|---|---|
| 1,984,420 | Moulin et al. | Dec. 18, 1934 |
| 2,013,362 | Riszdorfer | Sept. 3, 1935 |
| 2,179,717 | Fedotoff | Nov. 14, 1939 |
| 2,251,473 | Touceda | Aug. 5, 1941 |
| 2,325,463 | Axler | July 27, 1943 |
| 2,387,466 | Rath | Oct. 23, 1945 |
| 2,390,216 | Guedon | Dec. 4, 1945 |
| 2,527,780 | Willcox | Oct. 31, 1950 |
| 2,702,500 | De Bell | Feb. 22, 1955 |
| 2,796,010 | Gannett | June 18, 1957 |

FOREIGN PATENTS

| | | |
|---|---|---|
| 317,614 | Germany | Dec. 23, 1919 |